United States Patent Office 2,945,007
Patented July 12, 1960

2,945,007

LINEAR CONDENSATION POLYMERS FROM p-CARBOXYCARBANILIC ACID

John R. Caldwell and Russell Gilkey, Kingsport, Tenn., assignors to Eastman Kodak Company, Rochester, N.Y., a corporation of New Jersey No Drawing. Filed July 17, 1956, Ser. No. 598,255

18 Claims. (Cl. 260—75)

This invention relates to highly polymeric linear condensation polymers prepared by condensing p-carboxycarbanilic acid was one or more bifunctional hydroxy compounds such as glycols. A particular embodiment of this invention relates to highly polymeric linear polymers wherein the bifunctional carboxylic reactants include substantial proportions of compounds such as terephthalic acid, p,p'-sulfonyl dibenzoic acid, trans-hexahydroterephthalic acid, p,p,'-diphenic acid, etc. in addition to p-carboxycarbanilic acid. These modified polyesters have especially high melting points and are capable of being dyed well with cellulose acetate dyes, acid wool dyes and the like. The glycols which can be employed in preparing these polyesters include straight chain aliphatic and cycloaliphatic glycols such as tetramethylene glycol, cyclohexanedimethanol, pentamethylene glycol, neopentanediol, etc.

The prior art discloses numerous polyesters and polyester-amides prepared from carboxylic bifunctional reactants. However, it is rather surprising to find that p-carboxycarbanilic acid or esters or acid chlorides thereof can be employed in the preparation of high-melting linear polymers which contain urethane linkages which are unexpectedly stable and possess high melting points which are useful in the preparation of synthetic fibers valuable in manufacturing fabrics. In addition, the p-carboxycarbanilic structure in the polymers of this invention contributes quite significantly to the dyeability of the polymers produced. These polymers have dyeing characteristics which permit the employment of cellulose acetate dyes and acid wool dyes with surprisingly good results. The modified polyesters of this invention containing a bifunctional dicarboxylic compound which is a compound wherein the carboxyl radicals are attached to a hexacarbocyclic nucleus in para relationship possess melting points which are generally well above 200° C. and are admirably suited for the preparation of synthetic fibers.

Films from the polymers of this invention can be used as wrapping materials, dielectrics for electrical condensers, photographic film support, and for numerous other purposes. Molding compositions can be prepared from the polymers of this invention by the usual technique including the addition of other ingredients so as to form a molding composition in accordance with the requirements of any particular situation. These polymers can also be employed as ingredients in coating compositions including paints, insulating coatings, etc.

According to an especially advantageous embodiment of this invention, p-carboxycarbanilic acid can be considered as a valuable constituent in the formulation of any of the well known high melting linear polyesters produced from aromatic dicarboxylic acids or an isomer of hexahydroterephthalic acid. The use of a fairly substantial proportion of p-carboxycarbanilic acid in the preparation of such polyesters does not materially reduce the high melting point thereof and greatly improves the dyeability of these polyesters. Moreover, such polyesters have tensile strengths, elongation, elastic recovery and other characteristics which are essentially the same as those of the polyesters containing none of the p-carboxycarbanilic acid.

It is an object of this invention to provide novel highly polymeric linear polymers derived from a substantial proportion of p-carboxycarbanilic acid.

It is a further object to provide polyesters which are condensed with an additional dicarboxy bifunctional compound whereby the polyester is derived from a bifunctional carboxylic reactant which contains at least about 10 mole percent of p-carboxycarbanilic acid.

It is a further object of this invention to provide such condensation polymers from which fibers can be prepared which can be employed in the manufacture of improved fabrics of excellent stability, ironing characteristics and other valuable properties, being especially noteworthy in dye receptivity.

A further object of this invention is to provide new and improved condensation polymers which can be formed into films having desirable melting point, tensile strength, resistance to heat distortion, stability, etc.

A still further object of this invention is to provide new and improved condensation polymers suitable for the manufacture of molded products and coating compositions.

Other objects will become apparent from the description herein and the claims which follow.

According to one embodiment of this invention, there is provided a highly polymeric, high melting linear condensation polymer having a molecular structure comprising recurring units having the following formula:

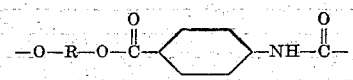

wherein R represents an organic radical containing from 2 to 10 carbon atoms which is the dehydroxylated residue derived from a bifunctional hydroxy compound (preferably a glycol).

According to another especially preferred embodiment of this invention there is provided a highly polymeric, linear polyester having a high melting point possessing a molecular structure which contains (1) a substantial proportion of recurring units having the following formula:

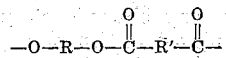

wherein R' represents an organic radical containing from 6 to 20 carbon atoms which is the dehydroxylated residue derived from a hexacarbocyclic dicarboxylic acid wherein the carboxy radicals are attached to a hexacarbocyclic nucleus in para relationship, and (2) at least 10 mole percent of recurring units having the following formula:

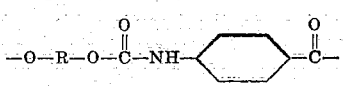

wherein each R represents an organic radical containing from 2 to 10 carbon atoms which is the dehydroxylated residue derived from a bifunctional hydroxy compound (preferably a glycol).

The bifunctional reactants which can be employed in accordance with this invention contain no other reactive (functional) substituents which would interfere with the formation of a highly polymeric linear polymer when condensed with p-carboxycarbanilic acid or an ester thereof. These bifunctional reactants adapted for the preparation of linear condensation polymers are quite well known in the prior art and are profusely illustrated by the numerous patents describing polyesters, polyesteramides, other modified polyesters, polycarbonates, block polymer modifications of these condensation polymers, etc.

The methods available for condensing p-carboxycarbanilic acid or an ester thereof with a bifunctional reactant to form a highly polymeric linear polymer are believed unique insofar as regards the employment of p-carboxycarbanilic acid. Especially unique and of particular advantage is the combination of p-carboxycarbanilic acid with another bifunctional dicarboxylic acid as described herein above so as to produce unusually advantageous modified polyesters. Methods for forming such highly polymeric linear condensation polymers such as polyesters, etc., are illustrated by the same patent art previously referred to; thus, any of the methods known in the art can be employed.

When the term p-carboxycarbanilic acid or its structural formula appears herein without further explanation, it is intended to include the esters thereof as well as the free acid. The chemical formula for p-carboxycarbanilic acid and its esters is as follows:

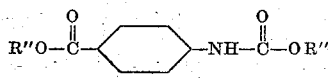

wherein each R″ represents a hydrogen atom or a lower alkyl radical such as methyl, ethyl, isopropyl, n-butyl, sec-butyl, tert-butyl, neopentyl, etc. The preparation of the free acid can be accomplished by the method described by King and Murch, J. Chem. Soc., 125, 2602. The esters of this free acid can be conveniently prepared by treating an ester of p-aminobenzoic acid with an alkyl chlorocarbonate in the presence of an alkali. Alternatively, the esters of this free acid can be made by esterifying the free acid by any of the usual esterification procedures.

As already mentioned, the p-carboxycarbanilic acid can be employed in admixture with an additional bifunctional coreactant such as when employing a mixture of 10 mole percent of p-carboxycarbanilic acid and 90 mole percent of terephthalic acid. In general the bifunctional reactants containing functional groups which can be condensed along with p-carboxycarbanilic acid (or its esters) include any of the bifunctional compounds capable of inter-reaction (condensation) so as to form highly polymeric linear condensation polymers. Such bifunctional compounds can be solely inter-reactive with a glycol, e.g. a dicarboxylic acid or they can be both (a) coreactive in the sense that they can be used in lieu of or as a partial replacement of the glycol in a polyester, and (b) inter-reactive in the sense that they condense with a glycol or a bifunctional hydroxy compound which can be employed in lieu of a glycol. Thus, 6-aminocaproic acid is both (a) coreactive in that the amino group is of the type which can be used in lieu of a hydroxy radical of a glycol, and (b) inter-reactive in the sense that the carboxylic group will react with the hydroxy of a glycol or the amine of a bifunctional compound which can be used in lieu of a glycol. The bifunctional compounds which are solely inter-reactive with a glycol include dicarboxylic acids, carbonates, etc. The other bifunctional inter-reactive compounds include aminocarboxy compounds or hydroxycarboxy compounds.

The bifunctional hydroxy compounds which can be employed for condensation with p-carboxycarbanilic acid (or mixtures thereof with other coreactive bifunctional compounds) include, among others, the polymethylene glycols such as ethylene glycol, trimethylene glycol, tetramethylene glycol, pentamethylene glycol, decamethylene glycol, etc. It has been found that when there is a fairly substantial proportion of p-carboxycarbanilic acid being employed in the preparation of a polyester (about 75 mole percent or more) it is especially advantageous to employ a polymethylene glycol containing at least 3 carbon atoms. In addition to the aliphatic polymethylene glycols which possess a straight-chain structure, there can also be advantageously employed the branched-chain aliphatic glycols, although the presence of branched chains ordinarily has a tendency to decrease the melting point of the polyesters produced. However, a branched-chain glycol having especially advantageous properties is 2,2-dimethyl-1,3-propanediol. Other gem-dialkyl glycols can be similarly employed with excellent results. Cyclic aliphatic glycols such as quinitol and 1,4-cyclohexanedimethanol can also be employed. The latter glycol produces especially efficacious polyesters in accordance with this invention and represents one of the preferred embodiments.

In forming the highly polymeric linear condensation polymers of this invention, those persons having ordinary skill in this art will readily perceive the various types of polymeric compositions which can be prepared employing p-carboxycarbanilic acid. Several types are more specifically described hereinbelow.

The broadest range of polyesters intended to be covered by this invention have melting points as low as about 100° C. and as high as about 300° C. Those highly polymeric linear polyesters and polyesteramides melting below about 200° C. are primarily useful for the preparation of molding compositions and coating compositions. Those modified polyesters, polyesteramides, etc. which melt at above about 200° C. have similar utility but are especially advantageous for the preparation of fibers and films having unusual value. The preferred polymers of this invention are those which have melting points of about 200° C. or higher, especially those which are adapted for the preparation of synthetic fibers.

The latter in its preferred sense can be said to encompass highly polymeric, linear polyesters having a modified molecular structure which (1) contains a substantial proportion of recurring units having the following formula:

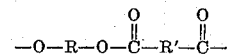

and (2) contains at least 10 mole percent of recurring units having the following formula:

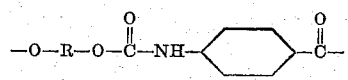

wherein R and R′ have been defined above. It is to be noted that it does not matter which end of the p-carboxycarbanilic structure is attached to the

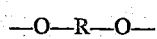

grouping in the representation of the structure of the recurring units. Although R′ has been defined in its preferred form, polymers can also be prepared wherein R′ represents the residue from any polymer-forming organic compound containing from 1 to 20 carbon atoms. Thus, modified polycarbonates are also contemplated. These additional recurring units in these modified polymers are the same as the principal recurring units in a different highly polymeric linear polyester derivable from a bifunctional dicarboxylic acid and a bifunctional glycol.

The condensation reaction used in preparing the polymers of this invention can be advantageously facilitated by the employment of a catalyst. The best catalyst for each reaction is determined by the nature of the reactants. Generally, when an alkyl ester of the acidic bifunctional carboxylated compound is employed, an ester interchange type of catalyst is to be preferred. Numerous patents have issued in the last few years describing a large number of advantageous catalysts which can be employed. Various techniques as to the use of the catalysts are well known in the art.

The reaction can generally be begun in the presence of an excess of the bifunctional hydroxy compound (e.g. a glycol). This initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The process can be considered finished at this stage. Another polymerization process is that involving polymerization in the solid phase in accordance with well known techniques. Thus, the polymeric condensation product produced as just described above but using a shortened period and lower temperature can be referred to as a "prepolymer," which prepolymer can then be cooled, pulverized, and the powder heated to a temperature somewhat less than that employed during the last stage of the molten phase "prepolymer" polymerization, thereby avoiding coagulation of the solid particles. The solid phase polymerization is advantageously conducted until the desired degree of polymerization is achieved. The solid phase polymerization, among other things, results in a high degree of polymerization without the accompanying degradation which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure. Continuous processes for preparing the polymers of this invention can also be employed.

Examples of hexacarbocyclic dicarboxylic acids wherein the carboxy radicals are attached to a hexacarbocyclic nucleus in para relationship include terephthalic acid, trans-hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenoxy)ethane, 4,4'-dicarboxydiphenyl ether, etc. All of these acids contain at least one hexacarbocyclic nucleus. Fused rings can also be present such as in 1,4- or 1,5-naphthylene dicarboxylic acid. The hexacarbocyclic dicarboxylic acids are preferably those containing a trans-cyclohexane nucleus or an aromatic nucleus containing from 1 to 2 benzene rings of which at least one has at least the usual benzenoid unsaturation. Of course, either fused or attached rings can be present. All of the compounds named in this paragraph come within the scope of this preferred group.

Examples of other bifunctional carboxylic organic acids which can also be employed and which are adapted to the formation of linear polyesters include oxalic acid, succinic acid, glutaric acid, adipic acid, azelaic acid, sebacic acid, dimethylmalonic acid, alpha, alpha-diethyladipic acid, dicarboxydiethyl ether, isophthalic acid, orthophthalic acid, hexahydro-orthophthalic acid. Carbonic acid is an obvious equivalent included among these other acids. These other acids are generally employed in relatively minor proportions and are generally omitted from the most advantageous embodiments of this invention.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc.

Examples of the various glycols which can be employed in accordance with this invention have been set forth hereinabove and include the straight-chain as well as the branched-chain aliphatic and cycloaliphatic glycols. Those familiar with the art are aware of the effect of the various non-functional substituents on glycol molecules which can be present which do not interfere with the formation of highly polymeric linear polyesters. It is well known that there are quite a variety of glycols available for the preparation of linear polyesters.

The various glycols which can be employed in the preparation of polyesters in accordance with this invention can be employed as esters thereof (such as esters of a lower alkanoic acid). However, it is generally advantageous to employ the free glycols.

The methods of forming the polyesters of this invention into fibers and film are well known in the art and need no elaboration herein; in brief, the polyesters of this invention can be heated and melt-extruded followed by quenching, drawing, and heat setting employing techniques that are described in the prior art.

This invention can be further illustrated by the following examples of preferred embodiments, although, it will be understood that these examples are included merely for purposes of illustration and are not intended to limit the scope of the invention unless otherwise specifically indicated:

*Example 1.—Polymer using tetramethylene glycol*

237 grams (1.0 mole) of p-carboxycarbanilic acid diethyl ester and 180 grams (2.0 moles) of tetramethylene glycol were placed in a reaction vessel equipped with a stirrer, a distillation column, and an inlet for purified nitrogen. A solution of 0.15 gram of titanium butoxide dissolved in 10 ml. of butyl alcohol was added as the catalyst. The mixture was stirred at 180–190° C. in a stream of nitrogen. Ethyl alcohol distilled as the ester interchange took place. After 90 to 95 percent of the alcohol had been removed, the temperature was raised to 220° C. and a vacuum of 0.1 mm. was applied. The melt was stirred at 220° C. for 1 hour. A high-viscosity, colorless polymer was obtained which had a melting point of 190°–200° C. The inherent viscosity of the polymer, as measured in 60 percent phenol and 40 percent tetrachloroethane (by weight), was 0.60. This polymer was found to produce films by the usual melt extrusion technique which were characterized by numerous characteristics necessary for employment as a wrapping material and for various other purposes. Fibers were also produced from this polymer.

*Example 2.—Polyester employing tetramethylene glycol modified with 80 mole percent of 4,4'-sulfonyldibenzoic acid*

420 grams (1.0 mole) of 4,4'-sulfonyldibenzoic acid, dibutyl ester, 59 grams (0.25 mole) of p-carboxycarbanilic acid diethyl ester, and 250 grams (2.5 moles) pentamethylene glycol were placed in a reaction vessel as described in Example 1. A solution of 0.2 gram sodium titanium butoxide in 10 ml. butyl alcohol was added as the catalyst. The mixture was stirred at 200° C. in a stream of purified nitrogen. A mixture of ethyl and butyl alcohol distilled as the ester interchange took place. Distillation of the mixed alcohols was essentially complete after 1 hour. The temperature was raised to 265° C. and a vacuum of 0.5 mm. was applied. A colorless, viscous melt was obtained by stirring for 1 hour at 265° C. The inherent viscosity (same solvent as above) of the polymer obtained was 0.78. This polymer was spun to form fibers which were formed into yarns and woven into fabrics and dyed with various cellulose acetate dyes. It was found that the fibers of this polyester dyed heavily with cellulose acetate dyes. They could also be dyed to medium shades with acid wool dyes. The physical characteristics of this polyester were exceptionally good and well adapted to permitting fabrics formed therefrom to be used as highly satisfactory wearing apparel, for example, the hot bar sticking temperature was 210–215° C. which indicates that fabrics of this polyester could be ironed satisfactorily by hand or machine ironing procedures.

*Example 3.—Polyester employing tetramethylene glycol modified with 50 mole percent of 4,4'-sulfonyldibenzoic acid*

420 grams (1.0 mole) of 4,4'-sulfonyldibenzoic acid, dibutyl ester, 237 grams (1.0 mole) of p-carboxycarbanilic acid, diethyl ester, and 500 grams (5.5 moles) of tetramethylene glycol were placed in a reaction vessel as described in Example 1. A solution of 0.30 gram of magnesium aluminum ethylate in 10 ml. of ethyl alcohol was added as the catalyst. The mixture was stirred at 200° C. in a stream of nitrogen. After distillation of the alcohols evolved through ester interchange, the temperature was raised to 280° C. A vacuum of 0.2 mm. was applied for 15 minutes to give a polymer having an inherent viscosity of approximately 0.2. This molten polymer was poured into water and dried. It was ground to a particle size of less than 0.02-inch. The powdered prepolymer was then heated at 225° C. in a vacuum of 0.05 mm. for 4 hours. The final product had an inherent viscosity (same solvent as above) of 0.98. It melted at 272–283° C. and gave fibers that dyed well with cellulose acetate dyes and acid wool dyes. This polyester was also well suited for the manufacture of sheets or films which could be colored, if desired, and employed as packaging materials and for numerous other purposes including supports for photographic emulsions.

*Examples 4–11.—Polyesters from various glycols modified with various dicarboxylic acids*

A series of high melting linear highly polymeric modified polyesters were prepared employing techniques as described in the preceding examples and having in the polymer composition the combination of ingredients shown in the following table. All of these polyesters were formed into fibers which were found to dye well with cellulose acetate dyes and also to dye satisfactorily with acid wool dyes although generally not as well as when employing cellulose acetate dyes; these modified polyesters had melting points above about 200° C. and inherent viscosities above 0.6 (generally much higher).

| Example No. | Mole Percent of Dicarboxylic Acid Components | Mole Percent of Glycol Components |
|---|---|---|
| 4 | 100% p-carboxy-carbanilic acid. | 100% trimethylene glycol. |
| 5 | 20% p-carboxy-carbanilic acid. 80% 4,4'-diphenic acid. | 100% 2,2-dimethyl-1,3-propanediol. |
| 6 | 15% p-carboxy-carbanilic acid. 85% terephthalic acid. | 100% ethylene glycol. |
| 7 | 20% p-carboxy-carbanilic acid. 80% 4,4'-sulfonyl-dibenzoic acid. | 100% hexamethylene glycol. |
| 8 | 15% p-carboxy-carbanilic acid. 85% 1,2-di (p-carboxy-phenoxy) ethane. | 100% trimethylene glycol. |
| 9 | 50% p-carboxy-carbanilic acid. 50% trans-cyclohexane-dicarboxylic acid. | 50% ethylene glycol. 50% 2,2-dimethyl-1,3-propanediol. |
| 10 | 65% p-carboxy-carbanilic acid. 35% 1,2-di (p-carboxy-phenyl) ethane. | 100% trans 1,4-cyclohexane-dimethanol. |
| 11 | 20% p-carboxy-carbanilic acid. 70% trans-1,4-cyclo-hexan-dicarboxylic acid. 10% hydroxypivalic acid. | 100% tetramethylene glycol. |

As is apparent from the above description of this invention, there are various combinations of glycols and dicarboxylic compounds which can be condensed, including:

A. p-Carboxycarbanilic acid or esters thereof
B. Hexacarbocyclic para-linked dicarboxylic organic acids or esters thereof (e.g. terephthalic, trans-hexahydroterephthalic, p,p'-sulfonyldibenzoic, etc.)
C. Bifunctional dicarboxylic organic acids (in lieu of or in addition to those of B)
D. Glycols The especially avantageous polyesters of this invention are derived from the condensation of a mixture consisting of A, B and D which contains at least 10 mole percent of A based upon the sum of A and B. As previously mentioned, when fairly substantial mole percentages of A are employed based on the total quantity of acid used, it is advantageous to employ a glycol having at least 3 carbon atoms. The employment of component C is not desirable in the preparation of fibers or films except when the amount of A approaches 10 mole percent of the total quantity of dicarboxylic components employed and at least 50 mole percent thereof is B. Generally, component C is employed only in the preparation of coating compositions, molding compositions and films where high melting points and other superior physical characteristics are of secondary consideration. The most advantageous polyesters of this invention are those adapted for employment in the manufacture of fibers, yarns, fabrics, and other textile materials wherein the amount of component B is at least 50 mole percent and the amount of component A is at least 10 mole percent.

Although some preferred uses have been given for the polymers of this invention, it is obvious that they can be mixed with other polymeric and plastic materials and used for a wide variety of purposes. Thus, the polymers described herein, either alone or in admixture, can be present in adhesive materials, textile treating compositions, lubricating compositions, etc. Lower molecular weight polymers can be prepared employing a terminating alcoholic compound and used as plasticizers in vinyl resins, cellulose esters, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A highly polymeric linear polyester of (I) a dicarboxylic acid composed of (A) from 10 to 100 mole percent of p-carboxycarbanilic acid, (B) from 0 to 90 mole percent of a hexacarbocyclic acid selected from the group consisting of terephthalic acid, hexahydroterephthalic acid, p,p'-sulfonyldibenzoic acid, 4,4'-diphenic acid, 1,2-di(p-carboxyphenoxy)ethane, and 1,2-di(p-carboxyphenyl)ethane and (C) a dicarboxylic acid different from said (A) and (B) acids which is a bifunctional organic acid containing from 6 to 20 carbon atoms, the amount of acid (C) being the mole percentage remaining from a minimum of 10 mole percent of acid (A) and 50 mole percent of acid (B) so that acid (C) is only present when there is at least 50 mole percent of acid (B) whereby the mole percentage of acid (C) has a maximum value of 40 mole percent, the sum of the mole percentages of acid (A), acid (B) and acid (C) being 100 mole percent, and (II) a glycol having the formula HO—R—OH wherein R is an aliphatic hydrocarbon radical containing from 2 to 10 carbon atoms, said polyester being characterized by melting at from about 100° C. to about 300° C. and having a minimum inherent viscosity of about 0.6 in 60% phenol and 40% tetrachloroethane and the structure of said polyester being characterized by containing from 10 to about 100 mole percent of recurring groups connected at both ends by ester linkages and having the following structure containing a urethane moiety:

wherein R is said aliphatic hydrocarbon radical.

2. A polyester as defined in claim 1 wherein the dicarboxylic acid (I) is composed of p-carboxycarbanilic acid as acid (A), 4,4'-sulfonyldibenzoic acid as acid (B) and none of acid (C), and the glycol (II) is pentamethylene glycol.

3. A polyester as defined by claim 1 wherein the dicarboxylic acid (I) is composed of p-carboxycarbanilic acid as acid (A), 4,4'-sulfonyldibenzoic acid as acid (B) and none of acid (C), and the glycol (II) is tetramethylene glycol.

4. A polyester as defined by claim 1 wherein the dicarboxylic acid (I) is composed of p-carboxycarbanilic acid as acid (A), 4,4′-sulfonyldibenzoic acid as acid (B) and none of acid (C), and the glycol (II) is 2,2-dimethyl-1,3-propanediol.

5. A polyester as defined by claim 1 wherein the dicarboxylic acid (I) is composed of p-carboxycarbanilic acid as acid (A), terephthalic acid as acid (B) and none of acid (C), and the glycol (II) is 1,4-cyclohexanedimethanol.

6. A polyester as defined by claim 1 wherein the dicarboxylic acid (I) is essentially composed of p-carboxycarbanilic acid and the glycol (II) is tetramethylene glycol.

7. A fiber of the polyester defined by claim 1.
8. A fiber of the polyester defined by claim 2.
9. A fiber of the polyester defined by claim 3.
10. A fiber of the polyester defined by claim 4.
11. A fiber of the polyester defined by claim 5.
12. A fiber of the polyester defined by claim 6.
13. A film of the polyester defined by claim 1.
14. A film of the polyester defined by claim 2.
15. A film of the polyester defined by claim 3.
16. A film of the polyester defined by claim 4.
17. A film of the polyester defined by claim 5.
18. A film of the polyester defined by claim 6.

References Cited in the file of this patent
UNITED STATES PATENTS

| | | |
|---|---|---|
| 2,614,120 | Caldwell | Oct. 14, 1952 |
| 2,794,795 | Reynolds | June 4, 1957 |